United States Patent [19]

Mizrah et al.

[11] Patent Number: 4,492,670
[45] Date of Patent: Jan. 8, 1985

[54] PROCESS FOR MANUFACTURING SOLID CATHODES

[75] Inventors: Tiberiu Mizrah, Schaffhausen; Matthias Hoffmann, Diessenhofen; Peter Käser; Klemens Heilig, both of Schaffhausen, all of Switzerland

[73] Assignee: Swiss Aluminium Ltd., Chippis, Switzerland

[21] Appl. No.: 572,798

[22] Filed: Jan. 23, 1984

[30] Foreign Application Priority Data

Feb. 10, 1983 [CH] Switzerland ............ 740/83

[51] Int. Cl.$^3$ .................. C25C 7/06; C25B 11/04
[52] U.S. Cl. ........................... 419/9; 419/12; 419/45; 419/46; 419/47; 419/54; 419/57; 204/67
[58] Field of Search .......... 419/8, 11, 12, 17, 19, 419/47, 54, 57, 9, 45; 204/67, 292, 294

[56] References Cited

U.S. PATENT DOCUMENTS

| | | | |
|---|---|---|---|
| 3,661,736 | 5/1972 | Holliday | 204/67 |
| 4,093,524 | 6/1978 | Payne | 204/67 |
| 4,308,114 | 12/1981 | Das et al. | 204/294 |
| 4,376,029 | 3/1983 | Joo | 204/294 |
| 4,410,412 | 10/1983 | Kugler | 204/67 |
| 4,439,382 | 3/1984 | Joo et al. | 204/67 |

*Primary Examiner*—John F. Niebling
*Attorney, Agent, or Firm*—Bachman and LaPointe

[57] ABSTRACT

The solid cathodes built into reduction cells for aluminum production have at least one workface which can be wet by the precipitated metal. The starting materials, which contain titanium, boron and carbon in powder form, are first intimately mixed in such proportions that the sum of the powdered carbon and any carbon extracted from the substrate is in excess with respect to the amount required by the starting materials to form titanium diboride. This mixture is heated under a neutral or reducing atmosphere to 1600°–2200° C. and held for 5–45 min at this temperature. The reaction product containing pores and channels is then heated further, to 2250°–2600° C., and held there for 10–60 min to form a compact titanium diboride/carbon eutectic. Subsequently, the solid cathode is cooled to room temperature.

14 Claims, No Drawings

PROCESS FOR MANUFACTURING SOLID CATHODES

BACKGROUND OF THE INVENTION

The invention relates to a process for manufacturing solid cathodes for a fused salt electrolytic cell for aluminum production, such that at least the working faces are wettable by the precipitated metal.

In the electrolytic production of aluminum from aluminum oxide the latter is dissolved in a fluoride melt comprised for the greater part of cryolite. The cathodically precipitated aluminum collects under the fluoride melt on the carbon floor of the cell, the surface of the molten aluminum itself or a solid body wettable by aluminum acting as the cathode. Attached to the anode beam and dipping into the electrolyte from above are anodes which in conventional processes are made of amporphous carbon. As a result of the electrolytic decomposition of the aluminum oxide, oxygen is produced at the anodes, combining with the carbon of the anodes to form $CO_2$ and CO. The electrolytic process generally takes place in the temperature range 940°–970° C.

It is known that when large current densities are employed the combination of vertical components of the resultant magnetic field with the horizontal components of current lead to an undesireable deformation or doming of the surface of the some centimeter deep metal bath and also to undesired, pronounced flow or stirring of the metal. At small interpolar distances this undesired deformation of the metal bath can be so large that the aluminum touches the anodes and causes short circuiting.

Furthermore, the flowing action of the metal leads to increased chemical dissolution of the metal at the surface or to a fine dispersion of the aluminum in the electrolyte; as a result of re-oxidation this leads to a lower current yield.

A lower current density would in principle be of advantage, but would involve unacceptable higher capital costs for the cells and the pot room.

Known for some time now are solid cathodes which are wettable by aluminum and permit a much smaller interpolar distance. The precipitated aluminum forms a film of metal on these solid cathodes which are such that the aluminum continuously flows off them. Another development is such that per projected base area of anode a plurality of solid cathodes; spaced apart from each other and having relatively small working faces; project out of the aluminum sump. These cathode bodies are mostly made of titanium diboride, which is a very expensive material. For this reason application on an industrial scale has not succeeded up to now.

The high cost of cathodes made form pure titanium diboride arises from the following three process steps:

(1) Titanium diboride is produced at high temperature by carbothermic means or plasma technology.

(2) Very fine grinding is necessary for powder production.

(3) Because of the need to produce green-strength blocks and the difficulty of furnace operation, a high reject rate results during shaping and sintering; energy and capital costs are high.

In principle there are two ways of lowering the high material costs for titanium diboride:

(1) Titanium diboride is deposited as a coating on a cheaper substrate, and/or (2) the titanium diboride is diluted with a cheaper material but at most to such an extent that the cathode as a whole is still wet by aluminum and still conducts electricity well.

Described in the German Patent Publication DE-DS 23 05 281 is a cathode or cathode element for the fused salt electrolytic production of aluminum, which is such that it has on one face a layer made up from a binery system comprising a refractory material and a small fraction of carbon, the said system being an eutectic of hard refractory metal and carbon. One of the starting materials, however, is very expensive titanium diboride, which limits the economic use of the cathode elements.

Described in the U.S. Pat. Nos. 3,661,736 and 4,308,114 is a solid cathode for fused salt electrolytic production of aluminum made up of a composite material. Refractory granules of a material which can be wet by aluminum are embedded in a carbon matrix. The production of the composite material involves, according to the first of these patents, mixing a fine carbon powder with granular titanium diboride and treating the mixture in a suitable thermal process; according to the second of these patents granular titanium diboride is mixed into tar and pitch. Such cathodes made of a composite material are much less resistant than cathodes made of pure titanium diboride as the carbon matrix comes into contact with the molten electrolyte.

Further, described in No. WO 82/01018 is a cathode made of a titanium diboride/graphite composite which always contains a high concentration of carbon. From the low $TiB_2$ content disclosed in this publication the expert can conclude that in that case either there is no titanium diboride/carbon eutectic present at all, or it is possibly present as a dispersion in a carbon matrix. It is clear that subsequent impregnation of the porous composite is necessary in order to achieve adequate mechanical strength.

The object of the present invention is to develop a process for manufacturing wettable solid cathodes for the fused salt electrolytic production of aluminum, which is such that it leads to substantially less expensive products of constant, good quality.

SUMMARY OF THE INVENTION

The foregoing object is achieved by way of the invention wherein powdered titanium and boron-containing starting materials are mixed intimately with powdered carbon such that the sum of the powdered carbon and any carbon extracted from a substrate is super-stoichiometric with respect to the titanium and boron-bearing starting materials required to form titanium diboride, the mixture is heated in a neutral or reducing atmosphere to a temperature lying between 1600° and 2200° C. and held 5–45 minutes at this temperature, then the reaction product containing pores and channels heated to 2250°–2600° C., held for 10–60 min at this temperature to form a compact titanium diboride/carbon eutectic, and then cooled to room temperature.

During the second stage of the reaction, that is heating to 2250°–2600° C. the titanium diboride/carbon eutectic is a molten phase. This eutectic can be produced both as a layer on a substrate and as a shaped solid body.

Employing the two-stage process according to the invention enables the following savings to be made over the normal method for producing titanium diboride:

(1) The whole process of powder preparation, that is chemical modification (high temperature stage) and fine grinding is eliminated.

(2) After the sintering the melted mass need only be sawn to shape; as a result the expensive shaping of the green strength blocks is eliminated. In the case of coatings the sawing is also omitted as the substrates already have the desired shape.

(3) The otherwise necessary high temperature steps (carbothermic treatment and sintering) are replaced by a single high temperature process in which the conversion of the starting materials to TiB$_2$ and the subsequent formation of the melt take place in the same device without cooling down unitl completion of the process.

DETAILED DESCRIPTION

The first step in the process, also called carbothermic treatment, usefully takes place at a reaction temperature between 2000° and 2200° C. The substance formed in the subsequent, second step in the process viz., formation of the melt or formation of the titanium diboride/-carbon eutectic, comprises intimately mixed quantities of titanium diboride and carbon, has a dark metallic gloss and contains about 8 wt.% carbon. Small amounts of TiC and B$_4$C can also be present in the eutectic structure.

Particularly suitable for carrying out the process are electric arc or induction furnaces in which both process steps can be carried out without cooling down between the steps. Depending on the type of furnace employed the molten eutectic can also be cast in a conventional manner e.g. by tapping or tilting the furnace.

The first step in the process is, with respect to the quality of the cathode produced and the manufacturing costs, preferably carried out with the following starting materials:

$$TiO_2 + B_2O_3 + 5C \rightarrow TiB_2 + 5CO \qquad (1)$$

$$2TiO_2 + B_4C + 3C \rightarrow 2TiB_2 + 4CO \qquad (2)$$

$$TiC + B_2O_3 + 2C \rightarrow TiB_2 + 3CO \qquad (3)$$

The titanium and boron containing reagents are mixed intimately in the stoichiometric amounts according to the equations. The fine powdered carbon on the other hand is added in excess i.e. in superstoichiometric amounts, preferably 5–20% in excess. In all three chemical reactions the point of equilibrium lies on the right hand side of the equations i.e. almost no reverse reaction takes place.

With respect to economics reaction (1) is the most favorable; the starting materials, the TiO$_2$ and B$_2$O$_3$, are reduced directly. The use of B$_4$C (2) instead of B$_2$O$_3$ leads to an increase in costs which is even more pronounced if using TiC (3).

The two-stage process for manufacturing a titanium diboride/carbon eutectic is, however, much more economical with all three above first steps than mixing commercially available titanium diboride with carbon and processing that in a conventional manner to a corresponding eutectic.

The production of coated cathodes involves the use of a substrate material which is mechanically stable at the reduction process temperature of 900°–1000° C. and is a good electrical conductor such as graphite of the types AFX and AFC supplied by the U.S. company "Poco Graphite" or easily graphitised coal. Usefully a 0.5–5 mm thick layer of intimately mixed starting materials is deposited on at least one face of the substrate.

These mixed starting materials can be deposited dry or as a paste (German: "Schlicker"). During the first stage, the formation of titanium diboride containing pores and channels, the layer does not bind itself to the carbon substrate. During the second stage, however, the formation of the titanium diboride/carbon eutectic, a fluid boundary layer forms and, after cooling, anchoring occurs between the substrate and the then compact titanium diboride/carbon eutectic.

When coating a carbon bearing substrate with the mixture of starting materials of TiO$_2$, B$_2$O$_3$ and carbon, usefully less carbon is added than when making a monolithic block of material as—during the second stage of the reaction viz., the formation of the eutectic—a greater or lesser amount of carbon is taken from the substrate depending on the temperature and duration of the reaction.

As the eutectic is formed the coating is reduced to about half its thickness; pores and channels are eliminated and a compact layer which is readily wet by molten aluminum is formed. Although this layer with a thickness of up to 3 mm can be regarded as rather thick, it must also be considered as extremely economical.

If solid bodies are to be made from intimately mixed starting materials via the above reactions (1) to (3), the powder mix, in an electric arc, induction or resistance heated furnace, is first made react in a first step of the process and then melted in a second step of the process. The reacted mass can preferably be allowed to cool slowly and then formed into the desired cathode shape using appropriate means of separation. The electric arc or induction furnace can, however, also be tapped or tilted for pouring if shapes are to be cast; these cast shapes are then preferably allowed to cool slowly. Such shaped bodies are much more economical to produce in the described manner according to the invention than producing the eutectic directly from titanium diboride e.g. in the form of 0.1–3 mm granulate and carbon.

Test series have shown that both monolithic cathodes of the titanium diboride eutectic and cathodes coated with the same eutectic are wet by aluminum, and that these are suitable for producing aluminum by the fused salt electrolytic reduction process. The expert has, surprisingly, found this effect to occur due to the presence of around 8 wt.% free carbon in the cathode or on the workface of the cathode. This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for manufacturing solid cathodes for the fused salt electrolytic production of aluminum wherein the cathode material is wettable by precipitated aluminum comprising:

mixing a powdered titanium and a boron containing material with a powdered carbon material where the ratio of the sum of the powdered carbon material is super stoichiometric in an amount between 5 to 20 wt.% in excess of the required stoichiometric amount with respect to said powdered titanium and a boron containing material to form titanium diboride so as to form a mixture;

heating said mixture to a first temperature of about between 2000° to 2200° C.;

holding said heated mixture at said first temperature for about 5 to 45 minutes to form a reaction product characterized by pores and channels;

heating said reaction product to a second temperature of about between 2250° to 2600° C.;

holding said heated reaction product at said second temperature for about 10 to 60 minutes to form a molten titanium diboride-carbon eutectic; and forming a wettable cathode from said molten titanium diboride-carbon eutectic.

2. A process according to claim 1 including the step of heating said mixture to said first temperature in a neutral atmosphere.

3. A process according to claim 1 including the step of heating said mixture to said first temperature in a reducing atmosphere.

4. A process according to claim 1 wherein both heating steps are carried out in an electric arc furnace without cooling between steps.

5. A process according to claim 1 wherein both heating steps are carried out in an induction furnace without cooling between steps.

6. A process according to claim 1 wherein both heating steps are carried out in a resistance heated furnace without cooling between steps.

7. A process according to claim 1 wherein finely powdered $TiO_2$ and $B_2O_3$ are mixed as the starting material in stoichiometric amounts and carbon is mixed in the required stoichiometric amount of between 5 to 20 wt.% in excess of the required stoichiometric amount.

8. A process according to claim 1 wherein finely powdered $TiO_2$ and $B_4C$ are mixed as the starting material in stoichiometric amounts and carbon is mixed in the required stoichiometric amount of between 5 to 20 wt.% in excess of the required stoichiometric amount.

9. A process according to claim 1 wherein finely powdered TiC and $B_2O_3$ are mixed as the starting material in stoichiometric amounts and carbon is mixed in the required stoichiometric amount of between 5 to 20 wt.% in excess of the required stoichiometric amount.

10. A process according to claim 1 wherein the mixed starting materials are deposited as a 0.5 to 5 mm thick dry layer on said substrate.

11. A process according to claim 1 wherein the mixed starting materials are deposited as a 0.5 to 5 mm thick pasty layer on said substrate.

12. A process according to claim 1 wherein the mixed starting materials react in a furnace which can be tapped or tilted, melted and then cast as shaped bodies or allowed to solidify as a cast block.

13. A process according to claim 1 wherein said fluid boundary layer is cooled slowly.

14. A process according to claim 1 wherein said wettable cathode is formed by forming a boundary layer of said molten titanium diboride-carbon eutectic on a substrate and cooling said fluid boundary layer on said substrate so as to deposit said layer on said substrate.

* * * * *